(12) United States Patent
Tsukiyama et al.

(10) Patent No.: US 6,818,729 B2
(45) Date of Patent: Nov. 16, 2004

(54) THERMOSETTING RESIN AND METHOD FOR PRODUCING THE SAME

(75) Inventors: Fumitoshi Tsukiyama, Hyogo (JP); Tadahiro Inada, Hyogo (JP)

(73) Assignee: Showa Highpolymer Co., Ltd., Tokyo (JP)

( * ) Notice: Subject to any disclaimer, the term of this patent is extended or adjusted under 35 U.S.C. 154(b) by 0 days.

(21) Appl. No.: 10/333,980

(22) PCT Filed: Aug. 30, 2001

(86) PCT No.: PCT/JP01/07491

§ 371 (c)(1),
(2), (4) Date: Jan. 28, 2003

(87) PCT Pub. No.: WO02/26850

PCT Pub. Date: Apr. 4, 2002

(65) Prior Publication Data

US 2003/0149137 A1 Aug. 7, 2003

(30) Foreign Application Priority Data

Sep. 28, 2000 (JP) ........................................ 2000-296613

(51) Int. Cl.$^7$ .............................................. C08G 12/30
(52) U.S. Cl. ....................... 528/254; 528/245; 528/256; 528/259; 528/495; 528/503; 524/13; 524/443; 524/494
(58) Field of Search ................................. 528/254, 245, 528/256, 259, 495, 503; 524/13, 443, 494

(56) References Cited

U.S. PATENT DOCUMENTS 5,206,066 A * 4/1993 Horacek ..................... 428/113

* cited by examiner

*Primary Examiner*—Duc Truong
(74) *Attorney, Agent, or Firm*—Sughrue Mion, PLLC

(57) ABSTRACT

This invention provides a thermosetting resin and a method for producing the same, in which 5% to 95% by weight of an aminoplast resin and 5% to 95% by weight of a polyalkylene glycol are subjected to a condensation reaction under alkaline conditions, the resulting reaction product is methoxylated with methanol, and pH of the methoxylated product is controlled in a range from 10 to 11. The thermosetting resin for impregnation of resins or for use in building materials obtained according to the invention is highly stable, can be diluted with water, has excellent workability, stiffness, chemical resistance, water resistance, moisture resistant strength, and adhesion in water, exhibits improved brittleness and has satisfactory flexibility and impact resistance.

7 Claims, No Drawings

THERMOSETTING RESIN AND METHOD FOR PRODUCING THE SAME

FIELD OF THE INVENTION

The present invention relates to a thermosetting resin and a method for producing the same.

BACKGROUND ART

Aminoplast resins and phenol resins have conventionally been used as thermosetting resins (impregnating resin compositions or adhesive resin compositions for building materials) for use in laminate sheets such as decorative laminated sheets and WPC (wood-plastic combination) sheets.

However, these conventional thermosetting resins are stiff but brittle, lack flexibility and toughness, are inferior in bending flexibility. When they are used as resins for paper impregnation in manufacture of decorative laminated sheets, for example, they split easily upon bending.

In manufacture of laminated sheets such as WPC sheets, paper is impregnated with the thermosetting resins, and the resulting impregnated paper is used as an adhesive layer between wood and wood or between a plastic and wood. However, the adhesive layer lacks flexibility and highly shrinks by heat to thereby invite the resulting product to warp.

Consequently, many proposals have been made to improve these properties of stiffness, brittleness and heat-shrinkable properties. For example, a process for improving physical properties has been proposed. In the process, a terminal group of a melamine resin is subjected to acrylic-modification or allyl-modification to thereby impart a double bond thereto, and the terminal double bond undergoes radical polymerization to thereby improve the physical properties of the resulting resin, such as toughness and flexibility. However, the acrylic-modified melamine resin is sensitive to light or heat, becomes excessively reactive and thereby has poor stability. In addition, the resin cannot be satisfactorily diluted with water, has thereby very poor workability and must be improved in these properties. The process in which a double bond derived from an allyl ether is introduced by allyl-modification does not effectively impart flexibility to a melamine resin and is insufficiently effective for improvement of the properties of stiffness and brittleness of the melamine resin, although it can improve the stability and diluting property with water of the acrylic-modified melamine resin.

To positively improve the properties of stiffness and brittleness of the melamine resins and other thermosetting resins, a process has been proposed in which an emulsion of a polymer such as an acrylic polymer or poly(vinyl acetate) is added to the thermosetting resins. However, the resulting resins have markedly decreased adhesive strength, water resistance, and moisture resistance and cannot be used in practice specifically as adhesives, although the process exhibits some effects upon improvement of the properties of stiffness and brittleness of the aminoplast resins.

When phenol resins are used in these applications, they are very slowly cured and have poor workability as compared with the aminoplast resins. In addition, the phenol resins are also stiff and brittle as in the aminoplast resins, lack flexibility and impact resistance and invite discoloration of paper impregnated with the resins.

Separately, a technique has been proposed in which textile products are subjected to treatment with a resin using an aqueous solution containing an aminoplast resin, a diol surfactant and an acidic crosslinking catalyst (Japanese Unexamined Patent Application Publication No. 55-132777). However, the resulting products obtained by this technique have poor water resistance. In addition, when the aqueous solution is used as an adhesive resin composition for use in building materials such as decorative laminated sheets and WPC, the adhesive resin composition cannot satisfactorily be used in practice. When the aqueous solution is used as a resin composition for impregnating reinforcing materials or fillers such as center materials used for making tatami mats, the resulting composition has problems in its performances.

Another technique has been proposed in which an aminoplast resin is subjected to a condensation reaction with an alcohol having a polyethylene oxide chain by heating at 50° C. to 150° C. under strongly acidic conditions, and the resulting resin is applied to paper or a cloth for resin treatment (Japanese Unexamined Patent Application Publication No. 56-37399). However, the condensation reaction is highly reactive and cannot significantly be controlled. In this connection, the resulting resin in question can be used for imparting hydrophilicity to materials such as paper or cloths, for providing a smooth texture and for use as an antistatic agent, thus exhibiting some advantages. However, the resulting products show decreased water resistance and strength at high humidity, and have insufficient rigidity. Accordingly, the resin in question has low practical utility as an impregnating resin composition for impregnating reinforcing materials or fillers or an adhesive resin composition for use in building materials. As thus described, there are many proposals for imparting flexibility to aminoplast resins or for improving shrink properties thereof. However, some of them cannot sufficiently improve the properties, and the others invite insufficient performances such as poor water resistance or lack in workability despite they can improve properties, if any. Consequently, strong demands have been made on improvement of shrink properties and particularly on impartment of flexibility to molded articles while maintaining the characteristics of the aminoplast resins.

Accordingly, it is an object of the present invention to provide a thermoplastic resin as below and a method for producing the same. The thermosetting resin in question is very stable, can optionally be diluted with water before use with good workability, has high stiffness and chemical resistance that are advantages of aminoplast resins, has water resistance and high strength at high humidity, has improved brittleness, which brittleness is a disadvantage of the aminoplast resins, and thereby has excellent flexibility and impact resistance, and has excellent adhesive force in water. Thus, the thermosetting resin can advantageously be used for resin impregnation and as an adhesive for use in building materials.

DISCLOSURE OF INVENTION

The present invention provides:

[1] A thermosetting resin including a methoxylated alkaline-condensation product, the alkaline-condensation product including:
   5% to 95% by weight of an aminoplast resin (A) (solid content); and
   5% to 95% by weight of a polyalkylene glycol (B) (solid content);

[2] a method for producing a thermosetting resin including the steps of subjecting an aminoplast resin and a polyalkylene glycol to a condensation reaction under alkaline conditions to yield an alkaline-condensation product, methoxylating the alkaline-condensation product with methanol to yield a methoxylated product, and controlling pH of the methoxylating product in a range from 10 to 11;

[3] the method for producing a thermosetting resin as set forth in [2] wherein the aminoplast resin (A) is at least one selected from the group consisting of melamine-formaldehyde resins, melamine-glyoxal resins, urea-formaldehyde resins, urea-glyoxal resins, carbamide-formaldehyde resins, benzoguanamine-formaldehyde resins, and glycol-urea resins;

[4] the method for producing a thermosetting resin as set forth in [2] or [3] wherein the polyalkylene glycol (B) is polyethylene glycol or polypropylene glycol;

[5] the method for producing a thermosetting resin as set forth in any one of [2], [3] and [4] wherein 100 to 500 parts by weight of methanol is added to 300 parts by weight (solid content) of the alkaline-condensation product between the aminoplast resin and the polyalkylene glycol to thereby methoxylate the alkaline-condensation product;

[6] a method for producing a molded thermosetting resin, the method including the steps of adding a strongly acidic catalyst to the thermosetting resin as set forth in [1], impregnating a reinforcing material or a filler with the resulting mixture, and heating the impregnated article at 120° C. to 180° C. under a pressure; and

[7] the method for producing a molded thermosetting resin as set forth in [6] wherein the molded thermosetting resin is any one selected from decorative laminated sheets, WPC (wood-plastic combination), heat-resistant inorganic boards and center materials used for making tatami mats.

DETAILED DESCRIPTION OF THE INVENTION

The aminoplast resin (A) in the present invention is an essential component to impart thermosetting property and to hold stiffness, water resistance and moisture resistance of molded articles under normal conditions and wet conditions in the aforementioned applications.

Such aminoplast resins (A) for use in the present invention include, for example, known melamine-formaldehyde resins, melamine-glyoxal resins, urea-formaldehyde resins, urea-glyoxal resins, carbamide-formaldehyde resins, benzoguanamine-formaldehyde resins, and glycol-urea resins. Among them, melamine-formaldehyde resins are most preferably used, since they are excellent in all the properties including heat resistance, incombustibility, moisture resistance, water resistance and strength under normal conditions.

The amount of the aminoplast resin (A) is 5% to 95% by weight and preferably 30% to 70% by weight of the total solids of the aminoplast resin (A) and the polyalkylene glycol (B). If the amount of the aminoplast resin (A) is less than 5% by weight of the total solids, a cured product of the thermosetting resin has low stiffness, is low in the other physical properties such as strength under normal conditions, moisture resistance and water resistance, and the resulting cured product obtained by molding with the use of the thermosetting resin is poor in stiffness, strength and incombustibility. If the amount of the aminoplast resin (A) is more than 95% by weight of the total solids, the resulting product is stiff and brittle, significantly shrinks during molding and does not exhibit improved flexibility which is the primary object of the present invention. When the resulting thermosetting resin is used as an adhesive for use in laminated sheets such as WPC sheets, the sheets may warp due to significant shrinkage of the resin, inviting problems in quality control during manufacture preceding to deteriorated commercial value.

The polyalkylene glycol (B) in the present invention plays a role in imparting flexibility to a cured product of the thermosetting resin. A cured product of a thermosetting resin using the aminoplast resin (A) alone is stiff and brittle and highly shrinks. The polyalkylene glycol (B) improves these properties, impart flexibility to the cured product and minimize shrinkage.

When another thermosetting resin such as epoxy resin is used as an adhesive, the adhesive is very easily peeled although it has very high shear adhesive force. It is well known that a thermoplastic nylon resin is added to the thermosetting resin to improve this disadvantage effectively. The addition of the polyalkylene glycol to the aminoplast resin such as a melamine resin in the present invention probably has the same effect as in the above case and is very effective for improving adhesive force (peel strength) and physical properties of the resulting adherend.

The amount of the polyalkylene glycol (B) is 95% to 5% by weight and preferably 70% to 30% by weight of the total solids of the aminoplast resin (A) and the polyalkylene glycol (B).

Such polyalkylene glycols (B) for use in the present invention include, for example, polyethylene glycols and polypropylene glycols. Among them, a polyethylene glycol having a molecular weight of from about 200 to about 4000 is most preferred, since the resulting thermosetting resin composition has good water solubility and workability, and the molded product is excellent in physical properties such as flexibility, shrink properties and water resistance.

If the amount of the polyalkylene glycol (B) is less than 5% by weight of the total solids used, the thermosetting resin has poor flexibility and shrinks greatly during curing. In addition, when a molded article such as a decorative laminated sheet is manufactured by using this thermosetting resin, the resulting molded article has poor bending flexibility and is stiff and brittle. When the thermosetting resin is used as an adhesive for use in a laminated sheet such as WPC sheet, the thermosetting resin shrinks greatly, thus inviting warpage of the laminated sheet.

A method for producing the thermosetting resin of the present invention will be illustrated below, by taking a melamine-formaldehyde resin as a typical example of the aminoplast resin (A). The melamine-formaldehyde resin can be produced according to conventional procedures, of which an example will be described below.

Initially, melamine and formaldehyde in a predetermined ratio are allowed to react with each other under alkaline conditions at 70° C. to 100° C. for 30 to 60 minutes for methylolation of melamine and thereby yield a melamine-formaldehyde resin. The melamine-formaldehyde resin is then subjected to a condensation reaction with a polyalkylene glycol under alkaline conditions, for example, at 70° C. to 100° C. for 10 to 40 minutes and thereby yields a thermosetting resin composition of the present invention.

The thermosetting resin after the completion of the condensation reaction is methoxylated by treatment with methanol under strongly alkaline conditions of pH 11 or higher, for example, at 60° C. to 80° C. for 60 to 120 minutes according to necessity.

If the resulting resin has a methylol group as a terminal group, the resin is crystallized to thereby deteriorate its stability particularly at low temperatures in winter.

However, methoxylating the terminal group can prevent the crystallization to thereby improve the stability significantly. In addition, the resulting thermosetting resin can be diluted with water more satisfactorily.

The amount of methanol in methoxylation is preferably from 100 to 500 parts by weight relative to 300 parts by weight (solid content) of the melamine-formaldehyde resin. If the amount is less than 100 parts by weight, the stability may not sufficiently effectively be improved. If it exceeds 500 parts by weight, the cured product of the resin has deteriorated water resistance although it has improved low-temperature stability. These are not desirable except for some special cases.

Preferably, methanol is added for methoxylation after the completion of the condensation reaction between the melamine-formaldehyde resin and the polyalkylene glycol and after controlling pH to 11 or higher.

Thermosetting resins which are not methoxylated are used in applications which do not so much require stability and diluting property with water. In contrast, methoxylated thermosetting resins have much improved low-temperature stability, can optionally be diluted with water and are preferably used in applications which strongly require these properties.

After the completion of the methoxylation, pH of the reaction product is controlled to alkalinity of pH 10 to 11 and thereby yields a target methoxylated polyalkylene glycol-modified aminoplast resin (a thermosetting resin).

Aminoplast resins modified with the other alkylene glycols can be produced in the same manner.

The reaction product (thermosetting resin) thus obtained can be used as intact as an impregnating resin or an adhesive resin for use in building materials. Alternatively, the reaction product is concentrated under a reduced pressure to a certain concentration to remove excessive water, methanol, formaldehyde and other components before use in processing or use as an adhesive.

The thermosetting resin composition according to the present invention is stable against gelation and can satisfactorily be diluted. Accordingly, the thermosetting resin composition can be used in the following manner. Specifically, the thermosetting resin composition is diluted to an appropriate concentration according to necessity, a reinforcing material or filler is impregnated with the composition by application with a roller or brush or by immersing and is heated to cure the resin. Such reinforcing materials and fillers include, for example, paper, nonwoven fabrics, plastic sheets, lumbers, lumber boards, and other organic materials; rock wool boards, glass fiber mats, asbestos boards, and other heat-resistant inorganic materials. Alternatively, the composition is used as an adhesive in a laminated sheet and is heated. These procedures yield a cured resin completely having a network structure and thereby yield decorative laminated sheets, WPC sheets, acoustic boards, center materials used for making tatami mats, and sheathing boards. It is preferred that a strongly acidic catalyst is added to the thermosetting resin of the present invention in an amount of 2% to 5% by weight, the reinforcing material or filler is impregnated with the resulting mixture and is heated to 120° C. to 180° C. under a pressure (under a load). Such strongly acidic catalysts include, for example, para-toluenesulfonic acid, hydrochloric acid, formic acid, oxalic acid, nitric acid, ammonium chloride, and other compounds that yield $H^+$ ions as a result of decomposition.

Thus, the molded thermosetting resin is stiff but is excellent in flexibility, toughness, moisture resistance, water resistance, impact resistance and other properties, does not readily split even if it is bent, invites no warpage, and is very high in commercial value. It is particularly surprising that the thermosetting resin of the present invention is excellent in water resistance and moisture resistance as compared with a thermosetting resin that is produced by direct curing of a mixture of an aminoplast resin and a polyalkylene glycol without condensation.

BEST MODE FOR CARRYING OUT THE INVENTION

The present invention will be illustrated in further detail with reference to several examples and comparative examples below, which are not intended to limit the scope of the invention.

EXAMPLE 1

A polyalkylene-glycol-modified aminoplast resin for use in manufacture of a resin-impregnated paper was prepared in the following composition by the following procedure.

Initially, raw materials used are shown in Table 1.

TABLE 1

| | Raw material | Amount |
|---|---|---|
| (1) | Melamine | 350 g |
| (2) | Formaldehyde | 495 g |
| (3) | Sodium hydroxide (20% aqueous solution) | 0.8 ml |
| (4) | Polyethylene glycol (average molecular weight: 400) | 560 g |
| (5) | Sodium hydroxide (20% aqueous solution) | 16.5 ml |
| (6) | Methanol | 195 g |
| (7) | Hydrochloric acid (10% aqueous solution) | α ml |

Melamine (1), formaldehyde (2) and sodium hydroxide (3) were placed in a reactor, and melamine was methylolated by a reaction at pH 8.8 to 9.0 at 80° C. for 40 minutes. Next, polyethylene glycol (4) and sodium hydroxide (5) were added to the reaction mixture to control pH to 12.0 or higher, the resulting mixture was subjected to a condensation reaction with polyethylene glycol at 80° C. for 20 minutes.

Next, pH of the reaction mixture was controlled to a range from 11.0 to 12.0, the mixture was then cooled to 70° C., and methanol (6) was added thereto. The resulting mixture was then treated at 73° C. to 75° C. for 80 minutes for methoxylation reaction.

After cooling, the mixture was treated with hydrochloric acid (7) to control its pH to a range from 10 to 11 and thereby yielded a polyethylene-glycol-modified aminoplast resin. The prepared resin was subjected to tests mentioned later.

EXAMPLE 2

An ethylene-glycol-modified aminoplast resin was prepared by performing methylolation reaction, condensation reaction, methoxylation reaction, and pH control in the same manner as in Example 1, except that the polyethylene glycol used herein had an average molecular weight of 1000. The prepared resin was subjected to tests mentioned later.

EXAMPLE 3

A polyethylene glycol-modified aminoplast resin was prepared by performing methylolation reaction, condensation reaction, methoxylation reaction, and pH control in the same manner as in Example 1, except that the amount of the polyethylene glycol (average molecular weight: 400) used in Example 1 was changed to 280 g. The prepared resin was subjected to tests mentioned later.

EXAMPLE 4

A polyethylene-glycol-modified aminoplast resin was prepared by performing methylolation reaction, condensation reaction, methoxylation reaction, and pH control in the same manner as in Example 1, except that the amount of the polyethylene glycol (average molecular weight: 400) used in Example 1 was changed to 840 g. The prepared resin was subjected to tests mentioned later.

COMPARATIVE EXAMPLE 1

An unmodified aminoplast resin was prepared in the same manner as in Example 1, except that the polyethylene glycol (average molecular weight: 400) used in Example 1 was not used herein.

COMPARATIVE EXAMPLE 2

A polyethylene glycol (average molecular weight: 400) itself was subjected to tests mentioned later.

COMPARATIVE EXAMPLE 3

An aminoplast resin modified with polyethylene glycol monomethacrylate was prepared by performing methylolation reaction, condensation reaction, methoxylation reaction, and pH control in the same manner as in Example 1, except that a polyethylene glycol ester modified with methacrylic acid (average molecular weight: 400) was used instead of the polyethylene glycol (average molecular weight: 400) used in the aminoplast resin in Example 1. The prepared resin was subjected to tests mentioned later.

COMPARATIVE EXAMPLE 4

A resin composition was prepared by adding a commercially available acrylic emulsion (Tg: 10° C.) to the aminoplast resin obtained in Comparative Example 1 in a solid content weight ratio of the aminoplast resin to the acrylic emulsion of 70:30. The resin composition was subjected to tests mentioned later.

[Paper Impregnation Test]

The resins prepared according to Examples 1 to 4 and Comparative Examples 1 to 4 were subjected to paper impregnation under the following conditions.

The aminoplast resin modified with polyethylene glycol monomethacrylate according to Comparative Example 3 could not be diluted with water and paper could not be impregnated with the same.

Table 2 shows the determination results of physical properties of the resulting impregnated paper.

Conditions for Paper Impregnation Test

Base: No. 2 Filter Paper available from Toyo Roshi Kaisha Ltd.
Impregnation condition: Amount: 40% to 45% (to paper)
  Predrying: at 80° C. for 10 min.
  Press curing at 140° C. at 3 MPa for 10 min.
  Eight plies of a filter paper were superimposed and cured.

Conditions for Flexural Strength Test

The flexural strength was determined according to the procedure described in JIS K-6911
  Test piece: 50 mm wide and 150 mm long
  Span: 100 mm
  Bending strength: 5 mm/min.

Impregnating Resin Formulation
  Resin: 100 g
  Curing catalyst (para-toluenesulfonic acid): 2 g
  Water: balance
  Total: 200 g

TABLE 2

Determined Physical Properties of Paper Impregnated with Resins

| | Example | | | | Comparative Example | | | |
|---|---|---|---|---|---|---|---|---|
| | 1 | 2 | 3 | 4 | 1 | 2 | 3 | 4 |
| Dilution with water | Good | Good | Good | Good | Good | Good | Poor | Good |
| Flexural strength (kgf) | 68 | 66 | 62 | 60 | 33 | 0 | un-workable | 18 |
| Flexure (mm) | 38.2 | 36.8 | 31.2 | 39.8 | 10.2 | 0 | | 38.8 |

INDUSTRIAL APPLICABILITY

The thermosetting resins of the present invention are resin compositions that are highly stable during storage or transportation, can easily be diluted with water and are used as resins for impregnation of paper, nonwoven fabrics, and other organic polymer sheet materials, lumbers, lumber boards, and other organic materials; or rock wool boards, glass fiber mats, asbestos boards, and other heat-resistant inorganic boards. When the resins are used for impregnation of the various reinforcing materials or fillers or used as adhesive resins for building materials, they exhibit the advantageous properties of aminoplast resins, such as strength and chemical resistance. In addition, the resins have improved disadvantageous properties of the aminoplast resins, such as low flexural strength, flexibility and impact resistance, and the property of brittleness. When the resins are cured, the resulting molded resins have high strength, excellent flexibility, impact strength and shrinkage resistance, as well as high chemical resistance, water resistance, and incombustibility as thermosetting resins.

These are materials having excellent properties, for example, as decorative laminated sheets, WPC sheets, reinforcing materials, and acoustic boards for use in furnishings and building materials.

What is claimed is:

1. A thermosetting resin comprising a methoxylated alkaline-condensation product, the alkaline-condensation product comprising:
  5% to 95% by weight of an aminoplast resin (A) (solid content); and
  5% to 95% by weight of a polyalkylene glycol (B) (solid content).

2. A method for producing a thermosetting resin, the method comprising the steps of subjecting an aminoplast resin and a polyalkylene glycol to a condensation reaction under alkaline conditions to yield an alkaline-condensation product, methoxylating the alkaline-condensation product with methanol to yield a methoxylated product, and controlling pH of the methoxylated product to a range from 10 to 11.

3. The method for producing a thermosetting resin according to claim 2 wherein the aminoplast resin (A) is at least one selected from the group consisting of melamine-formaldehyde resins, melamine-glyoxal resins, urea-formaldehyde resins, urea-glyoxal resins, carbamide-formaldehyde resins, benzoguanamine-formaldehyde resins, and glycol-urea resins.

4. The method for producing a thermosetting resin according to claim 2 or 3 wherein the polyalkylene glycol (B) is polyethylene glycol or polypropylene glycol.

5. The method for producing a thermosetting resin according to any one of claims 2 to 4 wherein 100 to 500 parts by weight of methanol is added to 300 parts by weight (solid content) of the product of alkaline-condensation between the aminoplast resin and the polyalkylene glycol to thereby methoxylate the alkaline-condensation product.

6. A method for producing a molded thermosetting resin, the method comprising the steps of adding a strongly acidic catalyst to the thermosetting resin as claimed in claim 1, impregnating a reinforcing material or a filler with the resulting mixture, and heating the impregnated article at 120° C. to 180° C. under a pressure.

7. The method for producing a molded thermosetting resin according to claim 6 wherein the molded thermosetting resin is any one selected from decorative laminated sheets, WPC (wood-plastic combination), heat-resistant inorganic boards, and center materials used for making tatami mats.

* * * * *